(12) United States Patent
Hamburg et al.

(10) Patent No.: US 11,418,334 B2
(45) Date of Patent: Aug. 16, 2022

(54) PROTECTING MODULAR INVERSION OPERATION FROM EXTERNAL MONITORING ATTACKS

(71) Applicant: CRYPTOGRAPHY RESEARCH, INC., Sunnyvale, CA (US)

(72) Inventors: Michael Alexander Hamburg, San Franciso, CA (US); Michael Tunstall, Walnut Creek, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 16/756,099

(22) PCT Filed: Oct. 8, 2018

(86) PCT No.: PCT/US2018/054805
§ 371 (c)(1),
(2) Date: Apr. 14, 2020

(87) PCT Pub. No.: WO2019/079048
PCT Pub. Date: Apr. 25, 2019

(65) Prior Publication Data
US 2021/0028934 A1    Jan. 28, 2021

Related U.S. Application Data

(60) Provisional application No. 62/574,016, filed on Oct. 18, 2017.

(51) Int. Cl.
*H04L 9/08* (2006.01)
*H04L 9/30* (2006.01)
(Continued)

(52) U.S. Cl.
CPC .......... *H04L 9/0869* (2013.01); *G06F 21/602* (2013.01); *H04L 9/0618* (2013.01); *H04L 9/3006* (2013.01); *H04L 2209/046* (2013.01)

(58) Field of Classification Search
CPC ... H04L 9/0869; H04L 9/0618; H04L 9/3006; H04L 2209/046; H04L 9/003;
(Continued)

(56) References Cited

U.S. PATENT DOCUMENTS 6,154,541 A  *  11/2000  Zhang .................. H04L 9/3073
                                                              380/28
6,823,070 B1 *  11/2004  Smith .................. H04L 9/0894
                                                              380/282

(Continued)

FOREIGN PATENT DOCUMENTS

EP    2 738 973 A1    4/2014
GB      2399904 A     9/2004
(Continued)

OTHER PUBLICATIONS

EP Extended European Search Report with dated May 21, 2021 re: EP Appln. No. 18869020.0. 8 pages.
(Continued)

*Primary Examiner* — Quazi Farooqui
(74) *Attorney, Agent, or Firm* — Lowenstein Sandler LLP (57) ABSTRACT

Systems and methods for performing modular inversion operations in a manner protected from external monitoring attacks. An example method comprises: determining, by a processor, a first masked value based on a public cryptographic key and a first random integer value; determining a second masked value based on the public cryptographic key and a second random integer value, and determining, based on the first masked value and the second masked value, a private cryptographic key represented by a modular inversion of the public cryptographic key.

17 Claims, 4 Drawing Sheets

(51) Int. Cl.
*H04L 9/06* (2006.01)
*G06F 21/60* (2013.01)

(58) Field of Classification Search
CPC . H04L 2209/12; H04L 2209/04; H04L 9/302; H04L 9/08; H04L 9/30; H04L 9/06; G06F 21/602; G06F 21/75; G06F 21/60
See application file for complete search history.

(56) References Cited

U.S. PATENT DOCUMENTS

| | | | |
|---|---|---|---|
| 7,987,201 | B2 | 7/2011 | Ramzan et al. |
| 8,402,287 | B2 | 3/2013 | Vigilant et al. |
| 9,014,368 | B2 | 4/2015 | Teglia |
| 2002/0186848 | A1 | 12/2002 | Shaik |
| 2005/0152539 | A1 | 7/2005 | Brickell |
| 2008/0222427 | A1 | 9/2008 | Baentsch et al. |
| 2009/0097637 | A1 | 4/2009 | Boscher et al. |
| 2015/0356281 | A1* | 12/2015 | Van Deventer ......... G06F 21/16 713/176 |
| 2018/0343119 | A1* | 11/2018 | Chen ...................... G06F 7/588 |

FOREIGN PATENT DOCUMENTS

| | | |
|---|---|---|
| WO | WO-02-058321 A1 | 7/2002 |
| WO | WO-2015-089300 A1 | 6/2015 |

OTHER PUBLICATIONS

Hamouda, Fabrice Ben, "Exploration of Efficiency and Side-Channel Security of Different Implementations of RSA", Sep. 1, 2011, XP055317706, Retrieved from the Internet: URL: http:/www.normalesup.org/~fbenhamo/files/stage2011/report.pdf [retrieved on Nov. 9, 2016]. 43 pages.

Notification of Transmittal of the International Search Report and the Written Opinion of the International Searching Authority, or the Declaration dated Dec. 11, 2018 re: Int'l Appln. No. PCT/US2018/054805. 27 Pages.

Preetha M., et al., "A Study and Performance Analysis of RSA Algorithm", IJCSMC, vol. 2, Issue 6, Jun. 2013. pp. 126-139. 14 Pages.

\* cited by examiner

PROTECTING MODULAR INVERSION OPERATION FROM EXTERNAL MONITORING ATTACKS

TECHNICAL FIELD

The present disclosure is generally related to computer systems, and is more specifically related to cryptographic data processing systems and methods.

BACKGROUND

Since the advent of computers, constantly evolving have been not only various systems and methods for safeguarding cryptographic keys and/or other sensitive data, but also systems and methods for gaining unauthorized access to the protected data, ranging from conceptually unsophisticated brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for protecting modular inversion operations from external monitoring attacks.

"Cryptographic data processing operation" herein shall refer to a data processing operation involving secret parameters (e.g., encryption/decryption operations using secret keys). "Cryptographic data processing device" herein shall refer to a data processing device (e.g., a general purpose or specialized processor, a system-on-chip, a cryptographic hardware accelerator, or the like) configured or employed for performing cryptographic data processing operations.

"Block cipher" herein shall refer to a cryptographic method which processes blocks of plaintext of a certain size in order to produce the corresponding cyphertext and/or blocks of cyphertext to produce the corresponding plaintext. "External monitoring attack" herein shall refer to a method of gaining unauthorized access to protected information by deriving one or more protected information items from certain aspects of the physical implementation and/or operation of the target cryptographic data processing device. Side channel attacks are external monitoring attacks that are based on measuring values of one or more physical parameters associated with operations of the target cryptographic data processing device, such as the elapsed time of certain data processing operations, the power consumption by certain circuits, the current flowing through certain circuits, heat or electromagnetic radiation emitted by certain circuits of the target cryptographic data processing device, etc.

Various side channel attacks may be designed to obtain unauthorized access to certain protected information (e.g., encryption keys that are utilized to transform the input plain text into a cipher text) being stored within and/or processed by a target cryptographic system. In an illustrative example, an attacker may exploit interactions of sequential data manipulation operations which are based on certain internal states of the target data processing device. The attacker may apply simple power analysis (SPA) or differential power analysis (DPA) methods to measure the power consumption by certain circuits of a target cryptographic data processing device responsive to varying one or more data inputs of sequential data manipulation operations, and thus determine one or more protected data items (e.g., encryption keys) which act as operands of the data manipulation operations.

The present disclosure introduces systems and methods for protecting cryptographic data processing operations, such as modular inversion operations, from external monitoring attacks, by generating two masked shares that may be utilized for computing the secret value (e.g., the cryptographic key), in various illustrative examples described herein below, the method of performing modular inversion operations may be utilized for implementing Rivest Shamir Adleman (RSA) cryptographic data processing operations. However, the systems and methods described herein may be applicable to various other cryptographic data processing methods.

The RSA cryptographic method utilizes three large positive integers e, d, and n such that $(m^e)^d = m \pmod{n}$ for any integer in, where mod n denotes the modulo operation which yield the remainder of Euclidian division of the operand by the value of n (e.g. a mod n is the remainder of Euclidian division of a by n). Therefore, assuming that it would not be practically feasible to derive the value of d from known values of e, n, or even m, the plaintext m (represented by a bit sequence which is interpreted as a positive integer in the examples described herein below) may be encrypted using the recipient's public key represented by the public exponent e to produce the cyphertext:

$$c = m^e \pmod{n}.$$

The cyphertext may then be transmitted to the recipient, who may recover the plaintext in by using the recipient's private key represented by the private exponent d to compute $$m = (m^e)^d \pmod{n} = c^d \pmod{n}.$$

In an illustrative example, the first communicating party may generate a pair of cryptographic keys, including the public key and the corresponding private key. Generating the keys may involve computing the value of modulus n as the product of two random large prime numbers:

$$n = pq.$$

The first communicating party may then compute the value of the Euler totient function of the modulus, denoted herein as $\varphi(n)$. The Euler totient function yields the number of integers k in the range $1 \leq k \leq n$ for which the greatest common denominator gcd(n, k)=1. Based on elementary properties of the Euler totient function, $\varphi(n)=\varphi(p)\varphi(q)=(p-1)(q-1)$.

The first communicating party may then choose an integer value e, such that $1<e<\varphi(n)$ and $\gcd(e, \varphi(n))=1$ (i.e., e and $\varphi(n)$ are co-prime). The value of e may then be published or otherwise communicated to the second communicating party as the public key of the first communicating party.

The second communicating party may encrypt the plaintext in using the first party's public key e to produce the cyphertext c:

$$c=m^e \pmod{n}$$

The second communicating party may then transmit the ciphertext to the first communicating party. In order to decrypt the received ciphertext, the first communicating party may compute the private exponent d as the modular multiplicative inversion of the public key e:

$$d=e^{-1} \bmod \varphi(n),$$

where $e^{-1}$ is the modular multiplicative inversion of e, such that $e \cdot e^{-1} \equiv 1 \pmod{\varphi(n)}$.

The first communicating party may then recover the plaintext in by decrypting the received ciphertext using the private exponent d:

$$m=c^d.$$

Notably, various common methods of computing the modular inversion $e^{-1} \bmod \varphi(n)$ involve determining the greatest common denominator (GCD), e.g., by the extended Euclidean GCD or the binary GCD algorithms, which include various conditional operations, and thus may be vulnerable to external monitoring attacks.

The present disclosure overcomes this and other known deficiencies of various common methods of performing cryptographic data processing operations, such as modular inversion operations. Thus, the systems and methods described herein represent improvements to the functionality of general purpose or specialized computing devices, by enabling performance of cryptographic data processing operations in a manner resistant to external monitoring attacks.

The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

Utilizing the notation from the above-described example of RSA cryptographic data processing operation, the goal is to compute the private exponent d as the modular multiplicative inversion of the public exponent e:

$$d=e^{-1} \bmod \varphi(n).$$

Protection from external monitoring attacks may be achieved by computing two co-prime masked shares $e_1$ and $e_2$ which may be derived from public exponent e as follows:

$$e_1=er \bmod \varphi(n)$$

$$e_2=es \bmod \varphi(n),$$

where r and s are random integers having the respective bit lengths similar to that of $\varphi(n)$ (i.e., the bit length of each of r and s may be different from the bit length of $\varphi(n)$ by no more than a pre-defined number of bits).

Then, two integers a and b may be computed (e.g., by the extended Euclidean GCD algorithm), such that $$ae_1+be_2=1$$

If $e_1$ and $e_2$ have a common factor greater than 1, then no such a and b will exist. In that case, the algorithm restarts with new values for $e_1$ and $e_2$.

Taking both parts of the last equation by mod $\varphi(n)$ would produce:

$$ae_1 \bmod \varphi(n)+be_2 \bmod \varphi(n)=1 \bmod \varphi(n)$$

Substituting $e_1$ and $e_2$ with their definitions, the last equation may be re-written as:

$$aer+bes=1 \bmod \varphi(n)$$

Then, applying trivial arithmetic transformations would produce:

$$aer+bes=e(ar+bs)=1 \bmod \varphi(n)$$

Finally, multiplying both sides by the multiplicative inverse of e would produce:

$$ar+bs=e^{-1} \bmod \varphi(n)=d.$$

Therefore, the private exponent d may be computed as the sum of additive shares a r+b s, thus protecting the cryptographic data processing operation from external monitoring attacks.

In an alternative embodiment, $e_1$ and $e_2$ may be determined as follows:

$$e_1=er$$

$$e_2=es+\varphi(n),$$

where r and s are random integers chosen such that $0<e r<\varphi(n)$, $0<e s<\varphi(n)$, and the rest of the derivation is the same as above.

Figure 1:
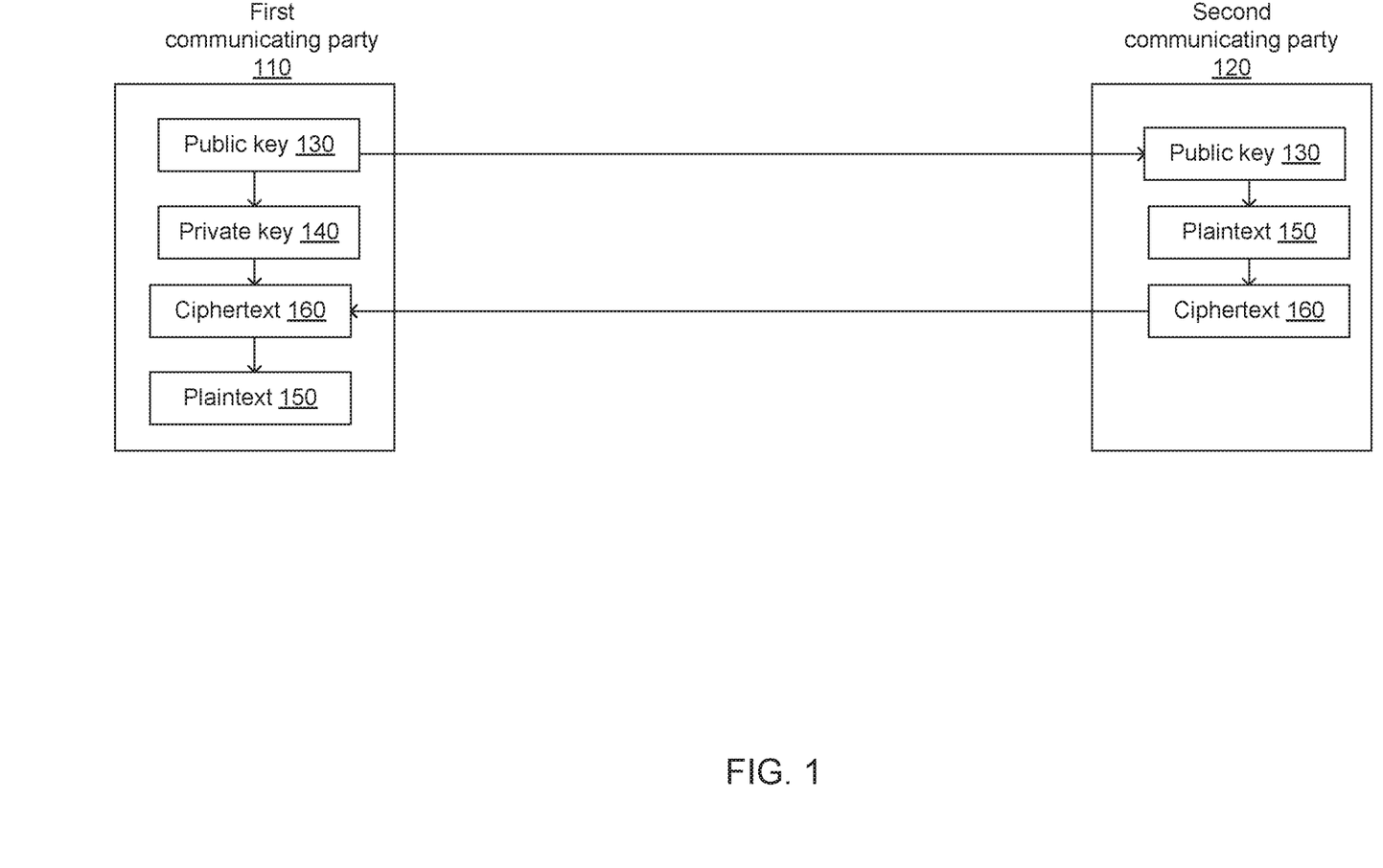
FIG. 1 schematically illustrates an example sequence of operations performed by two communicating parties in order to exchange secure messages over a public communication channel, in accordance with one or more aspects of the present disclosure.

FIG. 1 schematically illustrates an example sequence of operations performed by two communicating parties 110, 120 in order to exchange secure messages over a public communication channel, in accordance with one or more aspects of the present disclosure. As schematically illustrated by FIG. 1, the first communicating party 110 may generate a pair of cryptographic keys, including the public key 130 and the corresponding private key 140. Generating the keys may involve computing the value of modulus 11 as the product of two random large prime numbers:

$$n=pq.$$

The first communicating party may then choose an integer value e, such that $1<e<\varphi(n)$ and $\gcd(e, \varphi(n))=1$ (i.e., e and $\varphi(n)$ are co-prime). The value of e may then be published or otherwise communicated to the second communicating party 120 as the public key 130 of the first communicating party 110.

The second communicating party 120 may encrypt the plaintext 150 using the first party's public key 130 to produce the ciphertext 160:

$$c=m^e \pmod{\varphi(n)}$$

Figure 2:
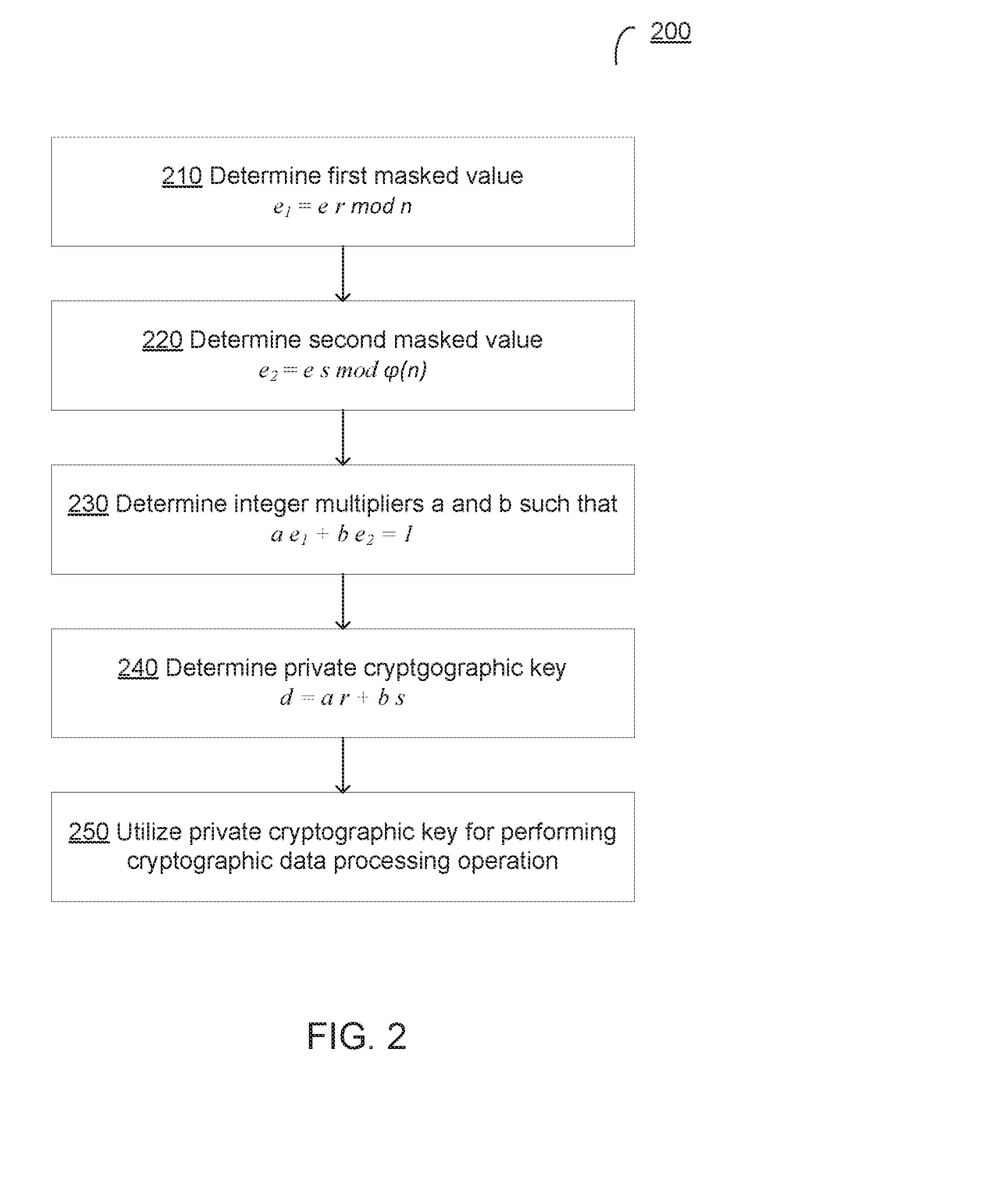
FIG. 2 depicts a flow diagram of an example method 200 for performing modular inversion operations in a manner resistant to external monitoring attacks, in accordance with one or more aspects of the present disclosure.

The second communicating party 120 may then transmit the ciphertext 160 to the first communicating party 110. In certain implementations, before encrypting the plaintext 150, the second communicating party 120 may split the plaintext 150 into multiple blocks of a given size, and pad the last incomplete block by a pre-defined bit pattern, as schematically illustrated by FIG. 2. The first communicating party 110 may then reassemble the plaintext 150 by concatenating the decrypted blocks.

In order to decrypt the received ciphertext 160, the first communicating party 110 may compute the private key 140, which may involve computing two co-prime masked shares $e_1$ and $e_2$ which, in one embodiment, may be derived from public exponent e as follows:

$$e_1 = er \bmod \varphi(n)$$

$$e_2 = es \bmod \varphi(n),$$

where r and s are random integers having the respective bit lengths similar to that of $\varphi(n)$ (i.e., the bit length of each of r and s may be different from the bit length of $\varphi(n)$ by no more than a pre-defined number of bits).

In an alternative embodiment, $e_1$ and $e_2$ may be determined as follows:

$$e_1 = er$$

$$e_2 = es + \varphi(n)$$

where r and s are random integers chosen such that $0 < e$ $r < \varphi(n)$ and $0 < e$ $s < \varphi(n)$.

Then, two integers a and h may be computed (e.g., by the extended GCD algorithm), such that $$ae_1 + be_2 = 1$$

If $e_1$ and $e_2$ have a common factor greater than 1, then no such a and b will exist. In that case, the algorithm restarts with new values for $e_1$ and $e_2$.

Finally, the private key 140 may be computed as the sum of additive shares:

$$d = ar + bs$$

The first communicating party 110 may then recover the plaintext 150 by decrypting the received ciphertext 160 using the private key 140:

$$m = e^d \bmod \varphi(n).$$

FIG. 2 depicts a flow diagram of an example method 200 for performing modular inversion operations in a manner resistant to external monitoring attacks, in accordance with one or more aspects of the present disclosure. Method 200 and/or each of its individual functions, routines, subroutines, or operations may be performed by one or more cryptographic data processing devices, e.g., represented by general purpose and/or specialized computing systems. Two or more functions, routines, subroutines, or operations of method 200 may be performed in parallel or in an order that may differ from the order described above. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processing threads implementing method 200 may be executed asynchronously with respect to each other. In an illustrative example, method 200 may be performed by computing system 400 of FIG. 4.

Referring to FIG. 2, at block 210, a cryptographic data processing device implementing the method may determine a first masked value $e_1$ as the remainder of integer division of the product of the public cryptographic key e and a first random integer value r by the modulus value n:

$$e_1 = er \bmod \varphi(n).$$

In an illustrative example, the modulus value may be represented by a value of the Euler totient function of a given modulus, denoted herein as $\varphi(n)$, as described in more details herein above. In another illustrative example, the modulus value may be represented by a product of a small integer k and a value of the Euler totient function of a given modulus, denoted herein as k $\varphi(n)$.

At block 220, the cryptographic data processing device may determine a second masked value $e_2$ as the sum of the modulus value $\varphi(n)$ and the remainder of integer division of the product of the public cryptographic key e and the second random integer s by the modulus value n:

$$e_2 = es \bmod \varphi(n).$$

At block 230, the cryptographic data processing device may determine a first integer multiplier a and a second integer multiplier b such that the sum of the product of the first integer multiplier and the first masked value and the product of the second integer multiplier and the second masked value equals to a pre-defined integer constant (e.g., one):

$$ae_1 + be_2 = 1.$$

At block 240, the cryptographic data processing device may determine a private cryptographic key represented by a multiplicative modular inversion of the public cryptographic key, by computing the sum of the product of the first integer multiplier and the first random integer value and the product of the second integer multiplier and the second random integer value:

$$d = ar + bs.$$

At block 250, the cryptographic data processing device may utilize the private cryptographic key for performing a cryptographic data processing operation. In an illustrative example, the cryptographic data processing device may utilize the private cryptographic key d to decrypt a received ciphertext c:

$$m = c^d \bmod n.$$

Figure 3:
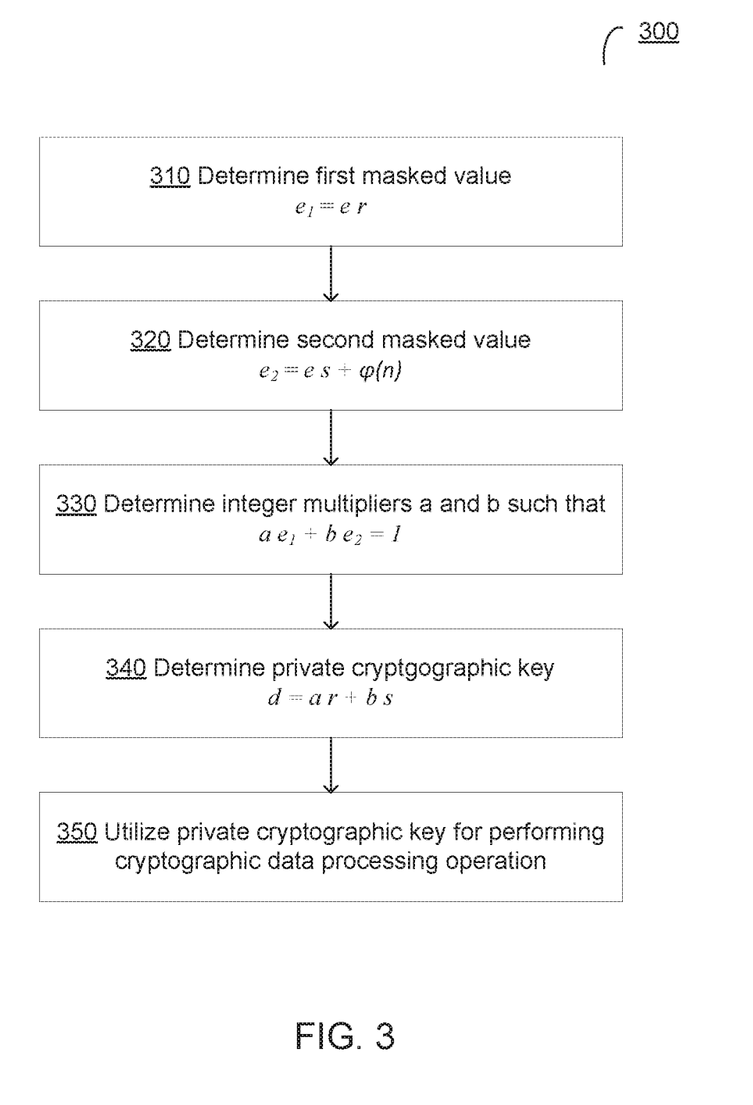
FIG. 3 depicts a flow diagram of another example method 300 for performing modular inversion operations in a manner resistant to external monitoring attacks, in accordance with one or more aspects of the present disclosure.

FIG. 3 depicts a flow diagram of another example method 300 for performing modular inversion operations in a manner resistant to external monitoring attacks, in accordance with one or more aspects of the present disclosure. Method 300 and/or each of its individual functions, routines, subroutines, or operations may be performed by one or more cryptographic data processing devices, e.g., represented by general purpose and/or specialized computing systems. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by computing system 400 of FIG. 4.

Referring to FIG. 3, at block 310, a cryptographic data processing device implementing the method may determine a first masked value $e_1$ as the product of the public cryptographic key e and a first random integer value r:

$$e_1 = er.$$

At block 320, the cryptographic data processing device may determine a second masked value $e_3$ as the sum of the modulus value φ(n) and the product of the public cryptographic key e and the second random integer s:

$$e_2 = es + \varphi(n).$$

In an illustrative example, the modulus value may be represented by a value of the Euler totient function of a given modulus, denoted herein as φ(n), as described in more details herein above. In another illustrative example, the modulus value may be represented by a product of a small integer k and a value of the Euler totient function of a given modulus, denoted herein as k φ(n).

At block 330, the cryptographic data processing device may determine a first integer multiplier a and a second integer multiplier b such that the sum of the product of the first integer multiplier and the first masked value and the product of the second integer multiplier and the second masked value equals to a pre-defined integer constant (e.g., one):

$$ae_1 + be_2 = 1.$$

At block 340, the cryptographic data processing device may determine a private cryptographic key represented by a multiplicative modular inversion of the public cryptographic key, by computing the sum of the product of the first integer multiplier and the first random integer value and the product of the second integer multiplier and the second random integer value:

$$d = ar + bs.$$

At block 350, the cryptographic data processing device may utilize the private cryptographic key for performing a cryptographic data processing operation. In an illustrative example, the cryptographic data processing device may utilize the private cryptographic key d to decrypt a received ciphertext c:

$$m = c^d \bmod n.$$

Figure 4:
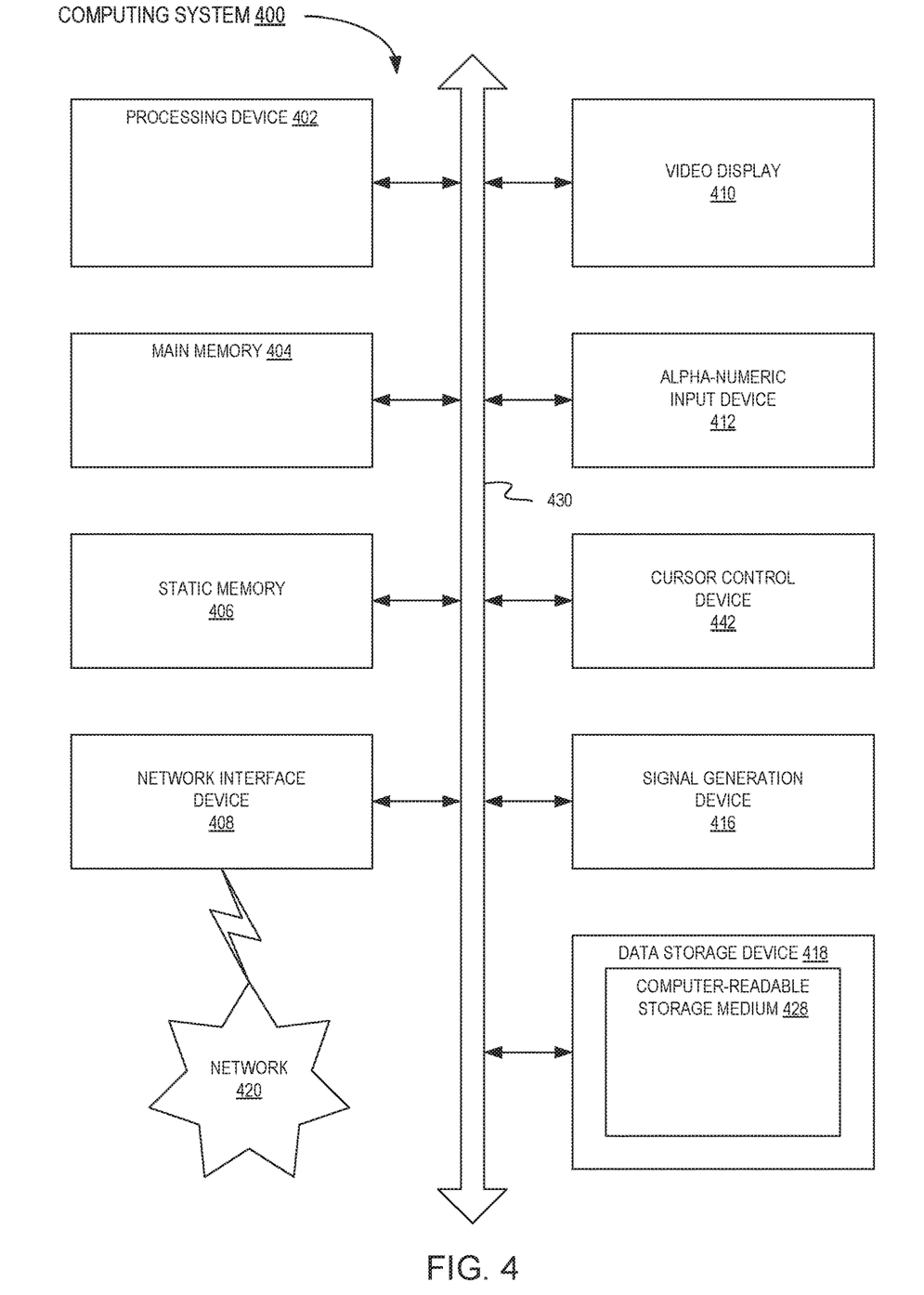
FIG. 4 illustrates a diagrammatic representation of a computing system 300 which may be employed for performing cryptographic data processing operations described herein.

FIG. 4 illustrates a diagrammatic representation of a computing system 400 which may be employed for performing cryptographic data processing operations described herein. Computing system 400 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 400 may include a processing device 402, which in various illustrative examples may be a general purpose or specialized processor comprising one or more processing cores. The example computing system 400 may further comprise a main memory 404 (e.g., synchronous dynamic random access memory (DRAM), read-only memory (ROM)), a static memory 406 (e.g., flash memory and a data storage device 418), which may communicate with each other via a bus 430.

The example computing system 400 may further include a network interface device 408 which may communicate with a network 420. The example computing system 400 also may include a video display unit 410 (e.g., a liquid crystal display (LCD) or a cathode ray tube (CRT)), an alphanumeric input device 412 (e.g., a keyboard), a cursor control device 442 (e.g., a mouse) and an acoustic signal generation device 416 (e.g., a speaker). In one embodiment, the video display unit 410, the alphanumeric input device 412, and the cursor control device 442 may be combined into a single component or device (e.g., an LCD touch screen).

The data storage device 418 may include a computer-readable storage medium 428 on which may be stored one or more sets of instructions implementing any one or more of the methods or functions described herein, e.g., method 200 of performing modular inversion operations in a manner resistant to external monitoring attacks. The instructions may also reside, completely or at least partially, within the main memory 404 and/or within the processing device 402 during execution thereof by the example computing system 400. Hence, the main memory 404 and the processing device 402 may also constitute or comprise computer-readable media. The instructions may further be transmitted or received over the network 420 via the network interface device 408.

While the computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method of performing a cryptographic data processing operation in a manner protected from external monitoring attacks, the method comprising:
determining, by a cryptographic data processing device, a first masked value equal to a remainder of integer division of a product of a public cryptographic key and a first random integer value by a modulus value;
determining a second masked value based on the public cryptographic key and a second random integer value; and
determining, based on the first masked value and the second masked value, a private cryptographic key represented by a modular multiplicative inversion of the public cryptographic key.

2. The method of claim 1, wherein the second masked value is represented by a sum of the modulus value and a remainder of integer division of a product of the public cryptographic key and the second random integer value by the modulus value.

3. The method of claim 1, wherein the modulus value is represented by a value of Euler totient function of a product of two random prime numbers.

4. The method of claim 1, wherein the public cryptographic key is represented by an integer value which is co-prime with the modulus value.

5. The method of claim 1, wherein the first masked value is represented by a product of the public cryptographic key and the first random integer value.

6. The method of claim 5, wherein the second masked value is represented by a sum of a modulus value and a product of the public cryptographic key and the second random integer value.

7. The method of claim 1, wherein determining the private cryptographic key further comprises:
computing a sum of a product of a first integer multiplier and the first random integer value and a product of a second integer multiplier and the second random integer value.

8. The method of claim 7, wherein a sum of a product of the first integer multiplier and the first masked value and a product of the second integer multiplier and the second masked value equals to a pre-defined integer constant.

9. The method of claim 1, further comprising:
utilizing the public cryptographic key and the private cryptographic key for performing a cryptographic data processing operation.

10. The method of claim 1, further comprising:
utilizing the private cryptographic key for decrypting a cyphertext that has been encrypted with the public cryptographic key.

11. A computer-readable non-transitory storage medium comprising executable instructions for perform a cryptographic data processing operation in a manner protected from external monitoring attacks, wherein the executable instructions, when executed by a computing device, cause the computing device to:
determining, by a cryptographic data processing device, a first masked value equal to a remainder of integer division of a product of a public cryptographic key and a first random integer value by a modulus value;
determining a second masked value based on the public cryptographic key and a second random integer value; and
determining, based on the first masked value and the second masked value, a private cryptographic key represented by a modular multiplicative inversion of the public cryptographic key.

12. The computer-readable non-transitory storage medium of claim 11, wherein the second masked value is represented by a sum of the modulus value and a remainder of integer division of a product of the public cryptographic key and the second random integer value by the modulus value.

13. The computer-readable non-transitory storage medium of claim 12, wherein the modulus value is represented by a value of Euler totient function of a product of two random prime numbers.

14. The computer-readable non-transitory storage medium of claim 12, wherein the public cryptographic key is represented by an integer value which is co-prime with the modulus value.

15. The computer-readable non-transitory storage medium of claim 11, wherein determining the private cryptographic key further comprises:
computing a sum of a product of a first integer multiplier and the first random integer value and a product of a second integer multiplier and the second random integer value.

16. The computer-readable non-transitory storage medium of claim 15, wherein a sum of a product of the first integer multiplier and the first masked value and a product of the second integer multiplier and the second masked value equals to a pre-defined integer constant.

17. The computer-readable non-transitory storage medium of claim 11, further comprising:
utilizing the public cryptographic key and the private cryptographic key for performing a cryptographic data processing operation.

* * * * *